J. L. FUSNER.
HOLLOW SHEET METAL ARTICLE.
APPLICATION FILED FEB. 28, 1910.
993,049.
Patented May 23, 1911.
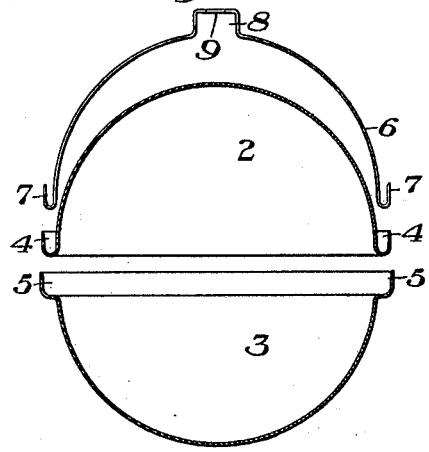
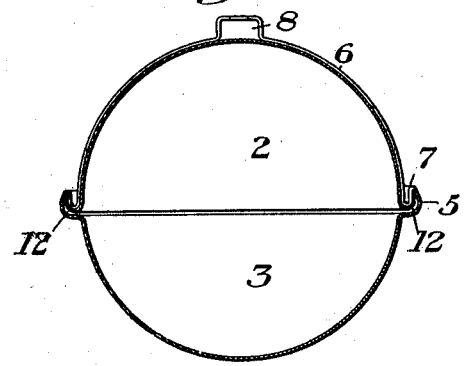
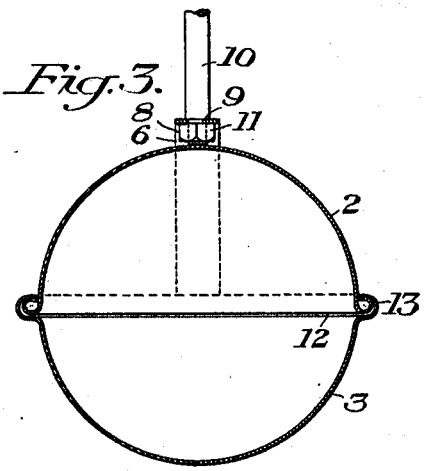
WITNESSES
R A Balderson
Walter Famariss
INVENTOR
J. L. Fusner,
by Bakewell, Byrnes & Parmelee,
his Attys.

UNITED STATES PATENT OFFICE.

JESSE LLRENO FUSNER, OF WELLSBURG, WEST VIRGINIA, ASSIGNOR TO EAGLE GLASS & MANUFACTURING COMPANY, OF WELLSBURG, WEST VIRGINIA, A CORPORATION OF WEST VIRGINIA.

HOLLOW SHEET-METAL ARTICLE.

993,049. Specification of Letters Patent. Patented May 23, 1911.

Application filed February 28, 1910. Serial No. 546,578.

*To all whom it may concern:*

Be it known that I, JESSE L. FUSNER, of Wellsburg, Brooke county, West Virginia, have invented a new and useful Improvement in Hollow Sheet-Metal Articles, of which the following is a full, clear, and exact description, reference being had to the accompanying drawings, forming part of this specification, in which—

Figure 1 is a sectional view of a hollow sheet metal float constructed in accordance with my invention and showing the formed parts separated from each other; Fig. 2 is a sectional view showing the welded connection between the parts; and Fig. 3 is a section taken at right angles to Fig. 2 showing the completed article.

My invention has relation to the construction of hollow sheet metal articles, and is particularly adapted to the construction of hollow sheet metal floats, but it may be applied to other vessels.

The invention is designed to provide a novel form of connection between the sections of which the article is composed, which will not be affected by expansion and contraction due to changes in temperature; which will reinforce and greatly increase the strength of the article; and which can be cheaply and rapidly made.

The nature of my invention will be best understood by reference to the accompanying drawings, in which I have shown it applied to the construction of a globular hollow sheet metal float, and which will now be described, it being premised, however, that various changes may be made in the form of the float sections, and that the invention is applicable to other hollow sheet metal articles, without departing from the spirit and scope of the invention as defined in the appended claims.

In these drawings, the numerals 2 and 3 designate the two sheet metal sections of which the float is composed, these sections being shown as of semi-globular form, although they will frequently be vertically elongated and may be of various forms. The lower edge portion of the upper section 2 is bent outwardly and upwardly to form the open flange 4. The upper edge portion of the lower section 3 is enlarged to form the flange 5, which is of greater internal diameter than the external diameter of the flange portion of the upper section.

6 designates a strap or stirrup, which provides means for the connection of the float to the usual float lever. This strap or stirrup is arched to approximately conform to the curvature of the upper section 2, and its lower end portions are bent backwardly and upwardly as shown at 7 so as to fit within the flange 4. The upper central portion of the strap or stirrup has an offset 8, which is perforated at 9 to receive the rod 10 by which the float is connected to the float lever, the lower end of this rod passing through the perforation 9 and engaging a nut 11, which is seated in the offset 8.

In uniting the parts, the flange 4 is inserted within the flange 5, and the bent end portions 7 of the strap or stirrup are inserted within the flange 4. The flanges 4 and 5 are then united at their extreme edge portions by welding, preferably by autogenous welding, by which the edge portions of these flanges are flowed together to form a practically integral connection. At the same time, and by the same operation, the bent end portions 7 of the strap or stirrup are also integrally united to the edges of the flanges 4 and 5.

Owing to the enlarged internal diameter of the flange portion of the lower section, a free space 12 is left between the flanges 4 and 5 after they have been united in the manner described, except at their free edge portions where the connection is formed. This is clearly shown in Figs. 2 and 3, and permits a free expansion and contraction of the article under changes of temperature without throwing stress upon the connection. After the flanged edges have been welded in the manner described, they are preferably turned inwardly from the position shown in Fig. 2 to the position shown in Fig. 3, thereby forming a bead 13 extending centrally around the article, and which greatly reinforces and strengthens it. The turning inwardly of the united edges of the sections to form this bead in no way closes up the space 12, which remains in the finished article, as shown in Fig. 3. Heretofore it has been customary to form articles of this kind by the provision of a separate strip or band uniting the edge portions of the sections and brazed thereto. The movements of expansion and contraction to which the article is subjected soon breaks down or weakens the brazed connection, and in a comparatively short time the joint becomes defective and permits the float to become waterlogged, thereby destroying its usefulness. In floats constructed in accordance with my invention, this defect is wholly overcome, since, as above explained, the movements of expansion and contraction are provided for without in any way straining or weakening the connection between the sections.

While I may definitely connect the strap or stirrup to the float in the manner described, yet my invention is not limited thereto, as it is obvious that various other means may be provided for connecting the float vessel to a float lever.

What I claim is:—

1. A hollow sheet metal article formed in sections, the meeting edges of the sections having interfitting flange portions, and the free edges of said flange portions being welded together, said flange portions being otherwise separated by a space to provide for expansion and contraction; substantially as described.

2. A hollow sheet metal float composed of two sections, one of said sections having its free edge portion bent backwardly to form a U-shaped flange, and the other section having its free edge portion expanded to form a flange of interior diameter larger than the exterior diameter of the flange portion of the other section, and the free edges of the flange portions being welded together, said flange portions being otherwise separated by a free space to provide for expansion and contraction; substantially as described.

3. A hollow float vessel, formed in sections having interfitting flange portions, the free edges of the flanges being welded, and the flange portions being otherwise separated to provide for movements of expansion and contraction; substantially as described.

4. A hollow sheet metal float vessel, formed in sections, one of said sections having a U-shaped flange, and the other section being enlarged or explained to form a flange portion of increased interior diameter, one of said flange portions fitting within the other, and the two portions being separated from each other except at their free edges, which are integrally united, and the united edges of the flange portions being bent inwardly to form an external surrounding bead; substantially as described.

5. A hollow sheet metal float vessel, formed in sections, one of said sections having a U-shaped flange, and the other section being enlarged or expanded to form a flange portion of increased interior diameter, one of said flange portions fitting within the other, and the two portions being separated from each other except at their free edges, which are integrally united, and the united edges of the flange portions being bent inwardly to form an external surrounding bead, and an attaching strap or stirrup having bent end portions fitted into the U-shaped flange of the first-named section and secured therein; substantially as described.

6. A hollow sheet metal article, formed in sections, the meeting edges of the sections having interfitting flange portions, the free edges of said flange portions being welded together and otherwise separated by a space to provide for expansion and contraction and the welded edge portions being turned in, substantially as described.

7. A float vessel, comprising wall sections joined together at their margins and forming a hollow closed body, and a stirrup embracing the hollow body and secured thereto at the joint between the sections, said stirrup constituting means for fastening the body to an operating device.

8. A float vessel, comprising substantially semi-spherical sections joined together at their margins and forming a hollow closed body, and a stirrup embracing one of the sections and having its ends secured to said body at the joint between the sections, said stirrup constituting means for fastening the body to an operating device.

In testimony whereof, I have hereunto set my hand.

JESSE LLRENO FUSNER.

Witnesses:
S. R. CALDWELL,
W. M. SIMPSON, Jr.

---

Copies of this patent may be obtained for five cents each, by addressing the "Commissioner of Patents, Washington, D. C."